United States Patent
Kim et al.

(10) Patent No.: US 9,389,489 B2
(45) Date of Patent: Jul. 12, 2016

(54) PHOTOGRAPHING APPARATUS FOR RECOGNIZING TYPE OF EXTERNAL DEVICE, METHOD OF CONTROLLING THE PHOTOGRAPHING APPARATUS, AND THE EXTERNAL DEVICE

(71) Applicant: SAMSUNG ELECTRONICS CO., LTD., Suwon-si, Gyeonggi-do (KR)

(72) Inventors: Hee-cheol Kim, Seoul (KR); Hun-young Ryu, Hwaseong-si (KR); Hyeon-woo Jeong, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 52 days.

(21) Appl. No.: 13/743,591

(22) Filed: Jan. 17, 2013

(65) Prior Publication Data
US 2013/0272692 A1    Oct. 17, 2013

(30) Foreign Application Priority Data
Apr. 16, 2012    (KR) .......................... 10-2012-0039294

(51) Int. Cl.
*G03B 17/18*    (2006.01)
*G03B 17/02*    (2006.01)
*G03B 17/56*    (2006.01)

(52) U.S. Cl.
CPC ............... *G03B 17/18* (2013.01); *G03B 17/02* (2013.01); *G03B 17/566* (2013.01); *G03B 2217/18* (2013.01)

(58) Field of Classification Search
CPC ...... G03B 17/18; G03B 17/02; G03B 17/566; G03B 2217/18
USPC ............. 396/56–59, 155, 373–386, 529–533, 396/544
See application file for complete search history.

(56) References Cited

U.S. PATENT DOCUMENTS

| | | | |
|---|---|---|---|
| 4,619,511 A * | 10/1986 | Goto ...................... | G03B 17/36 396/284 |
| 4,623,976 A | 11/1986 | Carp et al. | |
| 2006/0258400 A1 | 11/2006 | Lee | |
| 2012/0237197 A1* | 9/2012 | Iwatani ......................... | 396/535 |
| 2014/0009671 A1* | 1/2014 | Ozone et al. .................. | 348/371 |

FOREIGN PATENT DOCUMENTS

| | | |
|---|---|---|
| EP | 1 008 974 A2 | 6/2000 |
| EP | 2 648 041 A2 | 10/2013 |
| JP | 2000-047308 A | 2/2000 |
| JP | 2008-292765 A | 12/2008 |
| WO | WO 0065445 A1 * | 11/2000 .............. G06F 11/00 |

OTHER PUBLICATIONS

Extended European Search Report issued for EP 13152549.5 (Aug. 5, 2014).

* cited by examiner

*Primary Examiner* — Rochelle-Ann J Blackman
(74) *Attorney, Agent, or Firm* — Drinker Biddle & Reath LLP

(57) ABSTRACT

A photographing apparatus is provided that includes: a connector including a first terminal that is electrically connected to an external device; a first resistor that is electrically connected to the first terminal via a first node; and an external device recognizing unit that recognizes a type of the external device according to a voltage level of the first node, wherein a voltage level of the first node is determined according to a voltage distribution of the first resistor and a second resistor included in the external device.

18 Claims, 5 Drawing Sheets

| EXTERNAL DEVICE | R2 | Vn1 |
|---|---|---|
| Ring Flash (LED) | a | k |
| Wi-Fi | b | l |
| Movie Light | c | m |
| GPS | d | n |
| Speed light | <e | >o |

256
PHOTOGRAPHING APPARATUS FOR RECOGNIZING TYPE OF EXTERNAL DEVICE, METHOD OF CONTROLLING THE PHOTOGRAPHING APPARATUS, AND THE EXTERNAL DEVICE

CROSS-REFERENCE TO RELATED PATENT APPLICATION

This application claims the benefit of Korean Patent Application No. 10-2012-0039294, filed on Apr. 16, 2012, in the Korean Intellectual Property Office, the disclosure of which is incorporated herein in its entirety by reference.

BACKGROUND

Disclosed herein a photographing apparatus, an external device that is connectable to the photographing apparatus, and a method of recognizing the external device by the photographing apparatus.

External devices that are combinable with a photographing apparatus are widely used. For example, various types of external devices such as a speed light (a photographic flash unit), a global positioning system (GPS) module, a Wi-Fi module, an external view finder, etc. may be used. A user may utilize various functions by using an external device that provides functions that are not provided by the photographing apparatus. In addition, when the user wants further improved performance with respect to a predetermined function provided by the photographing apparatus, the user may use an external device providing the corresponding function.

SUMMARY

Various embodiments of the invention provide a connector of a photographing apparatus, which has a simplified structure, to which an external device is coupled.

Various embodiments of the invention also provide recognition of an external device even if the external device does not include a power supply, and also enhance compatibility of an external device by recognizing the external device by using an electrode included in a connector of photographing apparatuses.

According to an embodiment of the invention, there is provided a photographing apparatus comprising: a connector comprising a first terminal that is electrically connected to an external device; a first resistor that is electrically connected to the first terminal via a first node; and an external device recognizing unit that recognizes a type of the external device according to a voltage level of the first node, wherein a voltage level of the first node is determined according to voltage distributions of the first resistor and a second resistor included in the external device.

The photographing apparatus may further comprise a power supply unit that applies a first voltage to an end other than the first node of the first resistor when the external device is connected to the connector, and stops applying the first voltage when the type of the external device is completely recognized.

The external device recognizing unit may recognize the type of the external device by using a lookup table including data about the voltage level of the first node according to the type of the external device.

A first electrode may transmit an analog signal.

The photographing apparatus may further comprise an external device detecting unit that detects whether the external device is connected to the photographing apparatus by using power supplied from the external device.

The photographing apparatus may further comprise: a power supply unit that applies the first voltage to the other end of the first resistor when the external device is connected to the connector, and stops applying the first voltage when the type of the external device is completely recognized, wherein the external device detecting unit detects whether the external device is connected to the photographing apparatus after the applying of the first voltage is stopped.

The photographing apparatus may further comprise a second transistor comprising a gate terminal connected to the first terminal, a first terminal connected to a second node, and a grounded second terminal, wherein the second node is coupled to a first power source, and when the external device is connected to the photographing apparatus, power is supplied from the external device via the first terminal, wherein the external device detecting unit detects whether the external device is connected or not based on a voltage level of the second node as the second transistor is electrically conductive due to the power supplied from the external device.

The photographing apparatus may further comprise a trigger signal generating unit that outputs a trigger signal triggering light emission of a speed light via the first terminal when the external device is the speed light.

The photographing apparatus may further comprise a Zener diode connected to the first terminal.

According to another embodiment of the invention, there is provided an external device connected to a photographing apparatus, the external device comprising: a second resistor having a resistance value determined according to a type of the external device, connected to the photographing apparatus via a first terminal of a connector of the photographing apparatus, and electrically connected to a first resistor included in the photographing apparatus.

When the external device is connected to the photographing apparatus, the external device may operate using power supplied from the photographing apparatus.

The external device may supply a detection voltage, to the first terminal of the photographing apparatus by using the power supplied from the photographing apparatus.

According to another embodiment of the invention, there is provided a method of recognizing an external device by a photographing apparatus that recognizes a type of the external device when the external device is connected to the photographing apparatus, wherein the photographing apparatus comprises a first terminal and a first resistor electrically connected to the first terminal via a first node, and the external device is connected to the photographing apparatus via the first terminal and comprises a second resistor that is electrically connected to the first resistor when the external device is connected to the photographing apparatus, wherein the method comprises: applying a first voltage to an end other than the first node of the first resistor; measuring a voltage level of the first node; and recognizing the type of the external device according to a voltage level of the first node.

The method may further comprise, when the type of the external device is completely recognized, stopping application of the first voltage.

The type of the external device may be recognized using a lookup table including data about the voltage level of the first node according to the type of the external device.

The method may further comprise detecting whether the external device is connected to the photographing apparatus by using power supplied from the external device.

The method may further comprise stopping application of the first voltage when the type of the external device is completely recognized, wherein whether the external device is connected is detected after the applying of the first voltage is stopped.

The method of may further comprise outputting a trigger signal triggering light emission of a speed light via the first terminal if the external device is the speed light.

The second resistor of the external device may have a resistance value determined according to the type of the external device.

The external device may operate using the power supplied from the photographing apparatus.

BRIEF DESCRIPTION OF THE DRAWINGS

The above and other features and advantages of the invention will become more apparent by describing in detail exemplary embodiments thereof with reference to the attached drawings in which.

DETAILED DESCRIPTION

The description below and the attached drawings are provided to gain an understanding of operations according to the invention. Descriptions of elements or operations which may be easily implemented by one of ordinary skill in the art may be omitted.

The description and the drawings are not provided for limitation, and the scope of the invention should be defined by the appended claims. The meaning of the terms used in the present specification and claims of the invention should be construed as meanings and concepts not departing from the spirit and scope of the invention based on the principle that the inventor is capable of defining concepts of terms in order to describe his or her invention in the most appropriate way.

As used herein, the term "and/or" includes any and all combinations of one or more of the associated listed items.

Hereinafter, embodiments of the invention will be described with reference to the attached drawings.

Figure 1:
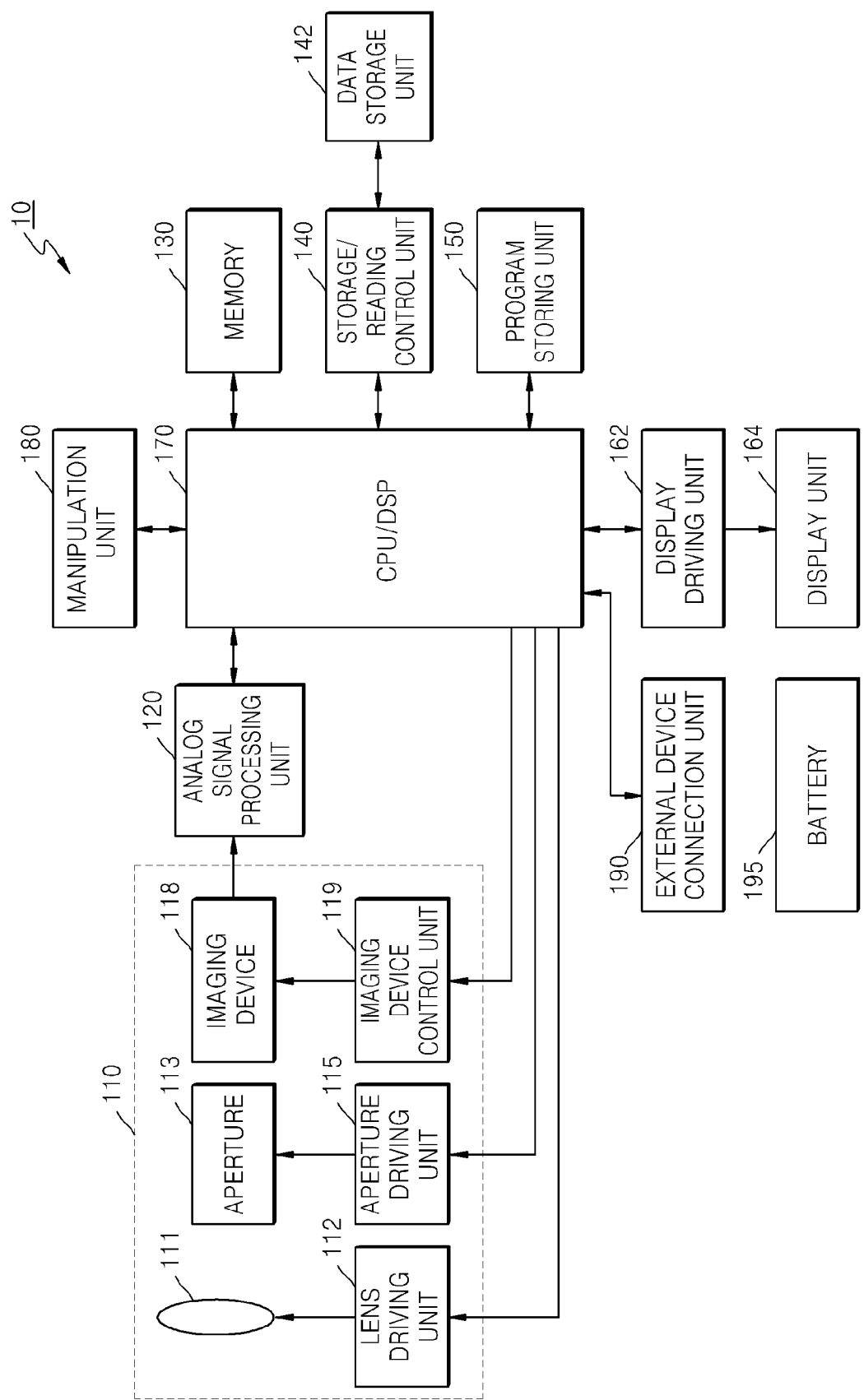
FIG. 1 is a block diagram illustrating a schematic structure of a photographing apparatus according to an embodiment of the invention.

FIG. 1 is a block diagram illustrating a schematic structure of a photographing apparatus 10 according to an embodiment of the invention.

Referring to FIG. 1, the photographing apparatus 10 according to an embodiment of the invention may include a photographing unit 110, an analog signal processing unit 120, a memory 130, a storage/reading control unit 140, a data storage unit 142, a program storing unit 150, a display driving unit 162, a display unit 164, a CPU/DSP 170, a manipulation unit 180, an external device connection unit 190, and a battery 195.

The overall operation of the photographing apparatus 10 is controlled by the CPU/DSP 170. The CPU/DSP 170 provides a control signal to each of a lens driving unit 112, an aperture driving unit 115, an imaging device control unit 119, or the like, to operate these elements.

The photographing unit 110 generates an image of an electrical signal from incident light, and includes a lens 111, the lens driving unit 112, an aperture 113, an aperture driving unit 115, an imaging device 118, and an imaging device control unit 119.

The lens 111 may include a plurality of groups of lenses and a plurality of sheets of lenses. A position of the lens 111 is adjusted by the lens driving unit 112. The lens driving unit 112 adjusts the position of the lens 111 according to the control signal provided by the CPU/DSP 170.

A degree of opening and closing of the aperture 113 is adjusted by the aperture driving unit 115. The aperture 113 adjusts an amount of light incident to the imaging device 118.

An optical signal transmitted through the lens 111 and the aperture 113 arrives at a light receiving surface of the imaging device 118 to form an image of a subject. The imaging device 118 may be a charge coupled device (CCD) image sensor or a complementary metal oxide semiconductor (CMOS) image sensor (CIS) that converts an optical signal into an electrical signal. Sensitivity of the imaging device 118 may be adjusted by the imaging device control unit 119. The imaging device control unit 119 may control the imaging device 118 according to a control signal that is automatically generated by an image signal that is input in real-time or a control signal that is manually input according to manipulation of a user.

An exposure time of the imaging device 118 is adjusted by a shutter (not shown). The shutter (not shown) may be a mechanical shutter that adjusts incidence of light by moving a screen or an electronic shutter that controls exposure by supplying an electrical signal to the imaging device 118.

The analog signal processing unit 120 may perform, for example, noise reduction, gain adjustment, waveform shaping, and analog-digital conversion on an analog signal that is supplied from the imaging device 118.

A signal that is processed by the analog signal processing unit 120 may be input into the CPU/DSP 170 through the memory 130 or not through the memory 130. In this regard, the memory 130 operates as a main memory of the photographing apparatus 10, and temporarily stores data that the CPU/DSP 170 requires during operation thereof. The program storing unit 150 stores programs such as an operating system, an application system, etc., that drives the photographing apparatus 10.

In addition, the photographing apparatus 10 includes a display unit 164 displaying an operation state of the photographing apparatus 10 or information regarding an image photographed by the photographing apparatus 10. The display unit 164 may provide visual data and/or audio data to a user. In order to provide visual data, the display unit 164 may be, for example, a liquid crystal display (LCD) panel or an organic light emitting display (OLED) panel. Furthermore, the display unit 164 may be a touch screen capable of recognizing a touch input.

The display driving unit 162 provides a driving signal to the display unit 164.

The CPU/DSP 170 processes an input image signal, and controls each of the elements according to the input image signal or an external input signal. The CPU/DSP 170 may reduce noise of input image data and perform image signal processing for improving image quality, such as gamma correction, color filter array interpolation, color matrix processing, color correction, and color enhancement on the input image data. Furthermore, the CPU/DSP 170 may generate an image file by compressing the image data generated by performing the image signal processing for improving image quality, or may restore the image data from the image file. An image compression format may be a non-lossy format or a lossy format. As appropriate examples, a still image may be converted into a Joint Photographic Experts Group (JPEG) format or a JPEG 2000 format. Furthermore, when a video image is recorded, a video image file may be generated by compressing a plurality of frames according to the Moving Picture Experts Group (MPEG) standard. The image file may be generated according to, for example, the Exchangeable image file format (Exif) standard.

The image data output from the CPU/DSP 170 is input into the storage/reading control unit 140 via the memory 130 or directly thereinto. The storage/reading control unit 140 stores the image data in the data storage unit 142 according to a signal transmitted from a user or automatically. In addition, the storage/reading control unit 140 reads data about an image from an image file stored in the data storage unit 142 and inputs the data into the display driving unit 162 via the memory 130 or via another path to display the image on the display unit 164. The data storage unit 142 may be detachable or may be permanently mounted in the photographing apparatus 10.

Furthermore, the CPU/DSP 170 may perform, for example, coloring, blurring, edge emphasis, image interpretation, image recognition, and other image effects. The CPU/DSP 170 may perform, as image recognition processing, face recognition processing, and scene recognition processing. In addition, the CPU/DSP 170 may perform display image signal processing to display an image on the display unit 164. For example, the CPU/DSP 170 may perform display image signal processing such as luminance level adjustment, color correction, contrast adjustment, outline emphasis adjustment, screen division processing, generation of character images, synthesis of images, etc. The CPU/DSP 170 may be connected to an external monitor and perform predetermined image signal processing to display an image on the external monitor, and transmit the processed image data so that the corresponding image is displayed on the external monitor.

In addition, the CPU/DSP 170 may execute a program stored in the program storage unit 150 or include an additional module and generate a control signal for controlling auto-focusing, zooming, focus change, auto-exposure correction, provide the control signal to the aperture driving unit 115, the lens driving unit 112, and the imaging device control unit 119, and generally control operations of elements included in the photographing apparatus 10 such as a shutter, a strobe light, or the like.

A user may input a control signal into the manipulation unit 180. The manipulation unit 180 may include various functional buttons such as a shutter-release button for inputting a shutter-release signal to capture an image by exposing the imaging device 118 to light for a predetermined period of time, a power button for inputting a control signal to control turning power on and off, a zooming button for broadening or narrowing a viewing angle according to an input, a mode selection button, a button for controlling other photographing setting values, etc. The manipulation unit 180 may be implemented in any type of input device through which a user may input a control signal, such as a button, a keyboard, a touch pad, a touch screen, a remote controller, etc.

The external device connection unit 190 exchanges a data signal or a control signal with the external device 20 (see FIG. 2) coupled to a connector 210 (see FIG. 2) included in the photographing apparatus 10 and activates the external device 20, supplies power to the external device 20, and recognizes or detects the external device 20.

The battery 195 is a power source of the photographing apparatus 10 and stores electrical energy and supplies power to the photographing apparatus 10. The battery 195 may be, for example, a lithium-ion battery, a nickel-cadmium battery, or a nickel-hydrogen battery. The battery 195 may be configured to be detachable from the photographing apparatus 10.

Figure 2:
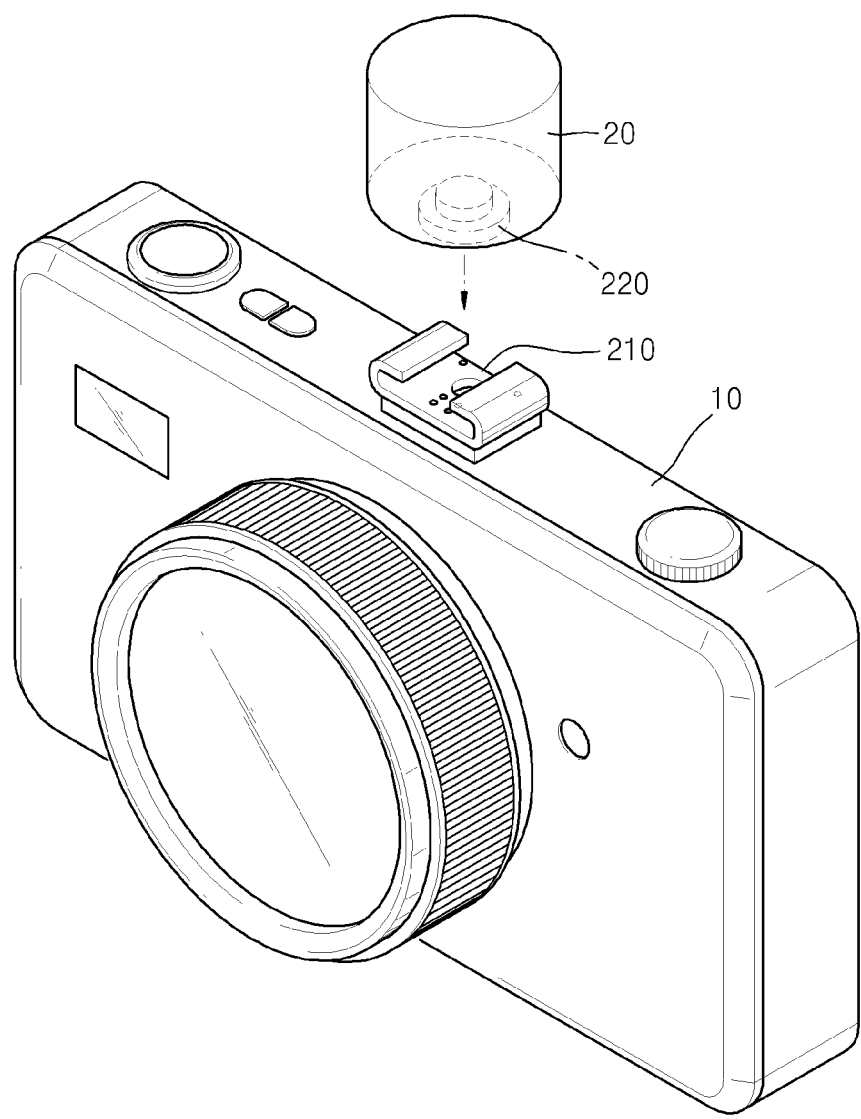
FIG. 2 is a perspective view illustrating the external appearance of a photographing apparatus according to an embodiment of the invention.

FIG. 2 is a perspective view illustrating the external appearance of the photographing apparatus 10 according to an embodiment of the invention.

Referring to FIG. 2, the photographing apparatus 10 according to an embodiment of the invention may include a connector 210 that is configured to be combinable to the external device 20. The external device 20 includes a connection portion 220 that is connectable to the connector 210 of the photographing apparatus 10. The connector 210 and the connection portion 220 are physically coupled to each other. Furthermore, each of the connector 210 and the connection portion 220 may include an electrode that may be used to transmit a data signal, a control signal, an analog signal, power, etc.

The external device 20 may be, for example, a speed light, a global positioning system (GPS) module, a Wi-Fi module, or an external viewfinder.

Figure 3:
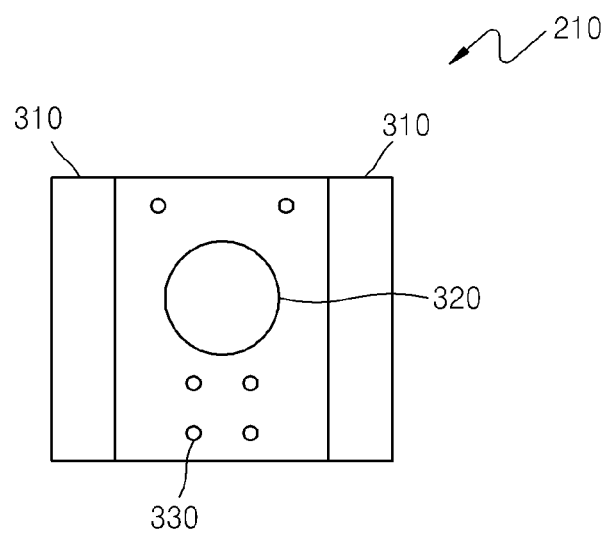
FIG. 3 is a plan view illustrating a structure of a connector of a photographing apparatus according to an embodiment of the invention.

FIG. 3 is a plan view illustrating a structure of the connector 210 of the photographing apparatus 10 according to an embodiment of the invention.

Referring to FIG. 3, the connector 210 according to an embodiment of the invention may include a fixing portion 310, at least one first electrode 320, and at least one second electrode 330.

The fixing unit 310 functions as a guide when the external device 20 and the connector 210 are coupled to each other, and fixes connection between the external device 20 and the connector 210 that are coupled to each other.

The at least one first electrode 320 is an electrode for transmitting an analog signal. The external device 20 includes a counter terminal that is electrically connected to the first electrode 320 of the photographing apparatus 10.

According to an embodiment of the invention, when a speed light is connected to the connector 210 as the external device 20, the first electrode 320 may output a trigger signal that triggers light emission of the speed light, to the external device 20.

According to the present embodiment, a type of the external device 20 is recognized by using a trigger electrode for the speed light included in the photographing apparatus 10, and thus, no additional electrode for recognizing the type of the external device 20 is required, and compatibility of the external device 20 is improved.

A position of the first electrode 320 may be determined according to, for example, Japanese Industrial Standards (JIS). Furthermore, the first electrode 320 may correspond to a first terminal AD (see FIG. 4) which will be described later.

The at least one second electrode 330 may be an electrode for transmitting a data signal or a control signal. For example, the at least one electrode 330 may transmit an enable signal, a clock signal, an input data signal, or an output data signal.

Also, power may be supplied via the at least one electrode 330. For example, the at least one second electrode 330 may include a driving voltage electrode or a ground electrode.

A signal transmitted from the at least one electrode 330 and a level of power output therefrom may vary according to the type of the external device 20.

Figure 4:
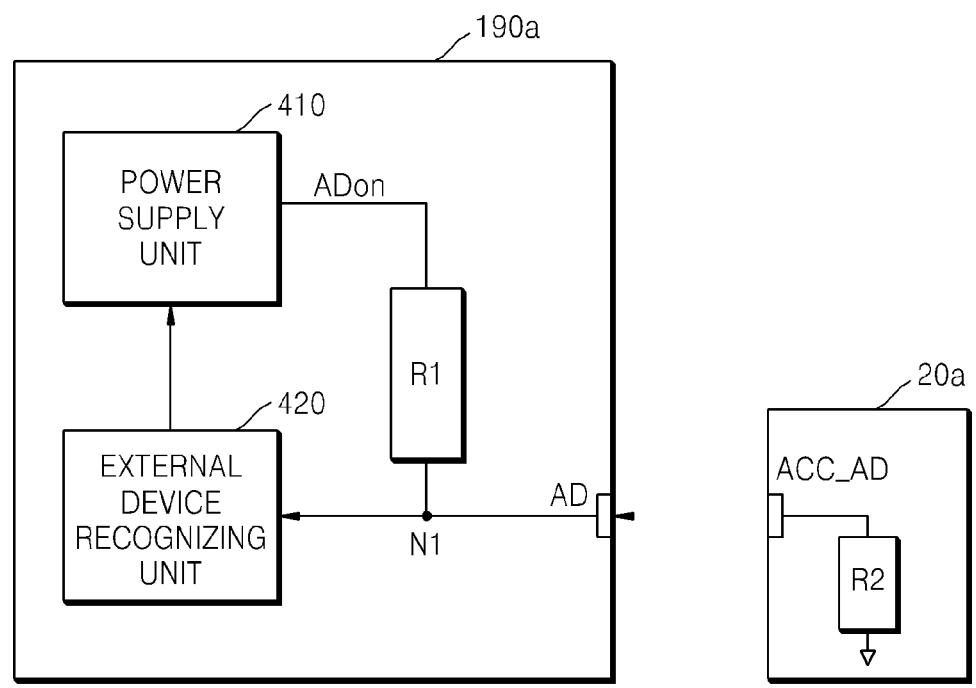
FIG. 4 illustrates structures of an external device connection portion and an external device according to an embodiment of the invention.

FIG. 4 illustrates structures of an external device connection portion 190a and an external device 20a according to an embodiment of the invention.

Referring to FIG. 4, the external device 20a according to an embodiment of the invention includes a first counter terminal ACC_AD that is electrically connectable to the first terminal AD and a second resistor R2. The second resistor R2 is a resistor connected between the first counter terminal ACC_AD and a ground terminal. According to an embodiment of the invention, the resistor R2 has different resistance values according to a type of the external device 20a. That is, a resistance value of the second resistor R2 is determined in advance according to the type of the external device 20a.

The external device connection portion 190a, according to an embodiment of the invention, may include a first resistor R1, a power supply unit 410, and an external device recognizing unit 420.

The power supply unit 410 may generate a first voltage ADon by using power output from the battery 195 (see FIG. 1) and applies the first voltage ADon to one end of the first resistor R1. The power supply unit 410 may include, for example, a DC/DC converter and a switching device.

The first resistor R1 is a resistive device that is connected between the power supply unit 410 and a first node N1. The first node N1 is a node that is electrically connected to the first terminal AD. If the first terminal AD of the photographing apparatus 10 and the first counter terminal ACC_AD of the external device 20a are electrically connected to each other, the first resistor R1 forms a voltage distribution circuit along with the second resistor R2 included in the external device 20a. Accordingly, if the first terminal AD and the first counter terminal ACC_AD may be electrically connected to each other, and the first voltage ADon is applied to the first resistor R1, a voltage between the first voltage ADon and the ground terminal of the external device 20a is distributed according to resistance values of the first resistor R1 and the second resistor R2, and thus a voltage level of the first node N1 is determined.

The external device recognizing unit 420 may detect a voltage of the first node N1 to recognize the type of the external device 20a according to the voltage level of the first node N1. As described above, since the second resistor R2 has different resistance values according to the type of the external device 20a, when the external device 20a is coupled to the connector 210, the voltage level of the first node N1 may vary according to the type of the external device 20a. Accordingly, the external device recognizing unit 420 may detect the voltage level of the first node N1, and recognize the type of the external device 20a by determining the external device 20a corresponding to the detected voltage level.

According to an embodiment of the invention, power supplied from the photographing apparatus 10 is used, and the type of the external device 20a is recognized by using a voltage distribution method, even if the external device 20a does not include a power source, and thus, the type of the external device 20a may be immediately recognized after coupling the external device 20 to the photographing apparatus 10.

Also, according to an embodiment of the invention, even if the external device 20a does not include an additional processor for generating a signal indicating identification information, the type of the external device 20a may be simply recognized, thereby simplifying the structure of the external device 20a, and reducing manufacturing costs.

In addition, according to an embodiment of the invention, no additional terminal for recognizing the external device 20a is required, thereby improving utility of the at least one second terminal 330 (see FIG. 3). Furthermore, the external device 20a does not additionally need the connector 210 according to a type thereof, a coupling structure between the external device 20a and the photographing apparatus 10 may be simplified, and the manufacturing costs of the photographing apparatus 10 and the external device 20a may be reduced.

Figures 5, 6:
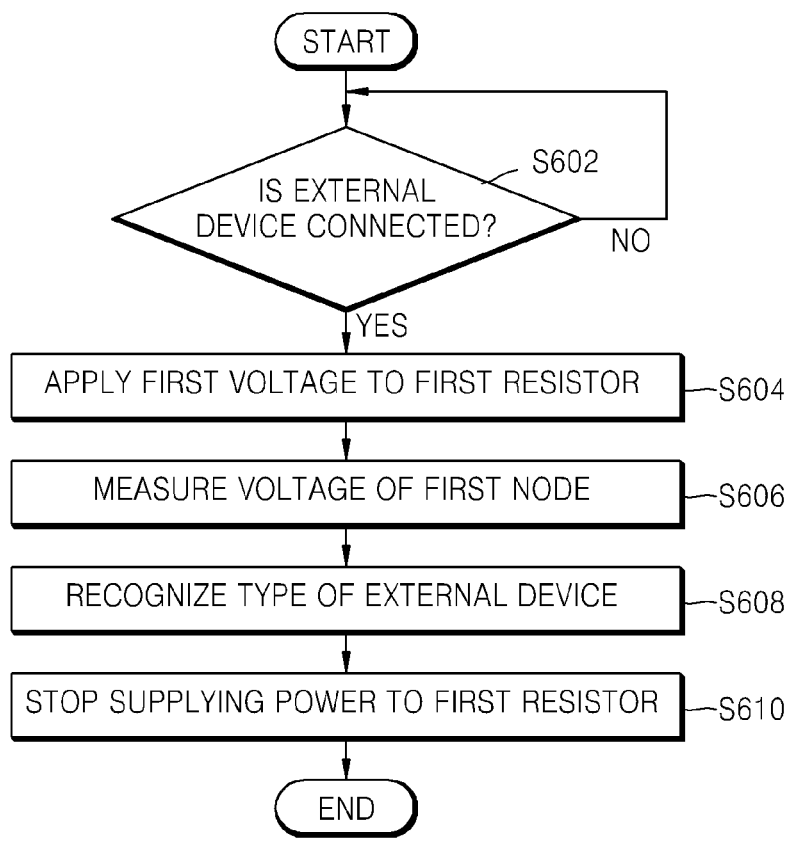
FIG. 5 illustrates a lookup table according to an embodiment of the invention.
FIG. 6 is a flowchart illustrating a method of recognizing an external device by a photographing apparatus according to an embodiment of the invention.

FIG. 5 illustrates a lookup table according to an embodiment of the invention.

Referring to FIG. 5, according to an embodiment of the invention, the external device recognizing unit 420 may recognize a type of the external device 20a by using the lookup table. The lookup table may indicate the type of the external device 20a according to a voltage level Vn1 of the first node N1. Also, the lookup table may include data about a resistance value of the second resistor R2 of the external device 20a. The resistance value of the second resistor R2 and/or the voltage level Vn1 of the first node N1 may be set as a predetermined value(s) and as a predetermined range(s). For example, a speed light may include a pull-up resistor connected to the first counter terminal ACC_AD, and thus, in this case, if a voltage level of the first terminal AD is equal to or higher than a predetermined value, the external device 20a may be recognized as the speed light.

According to an embodiment of the invention, when the external device 20a is coupled to the connector 210, the power supply unit 410 applies the first voltage ADon to one terminal of the first resistor R1, and then when the external device 20 is completely recognized, the power supply unit 410 may stop supplying the first voltage ADon to the one end of the first resistor R1. In this regard, when the external device 20a is completely recognized, the external device recognizing unit 420 may notify the power supply unit 410 that the external device 20 is completely recognized.

FIG. 6 is a flowchart illustrating a method of recognizing an external device for a photographing apparatus according to an embodiment of the invention.

When the external device 20a is connected in operation S602, the first voltage ADon is applied to one end of the first resistor R1 in operation S604.

Next, a voltage level of the first node N1 that is determined by resistance values of the first resistor R1 and the second resistor R2 is measured in operation S606. As described above, the second resistor R2 has a resistance value that is determined according to a type of the external device 20a, and thus, the voltage level of the first node N1 is differently determined according to the type of the external device 20a.

Next, in operation S608, the type of the external device 20a is recognized by using the measured voltage level of the first node N1. As described above, the type of the external device 20a may be determined using a lookup table showing a correspondence relationship between the type of the external device 20a and the voltage level of the first node N1.

When the type of the external device 20a is recognized, supply of the first voltage ADon to the first resistor R1 is stopped in operation S610.

Figure 7:
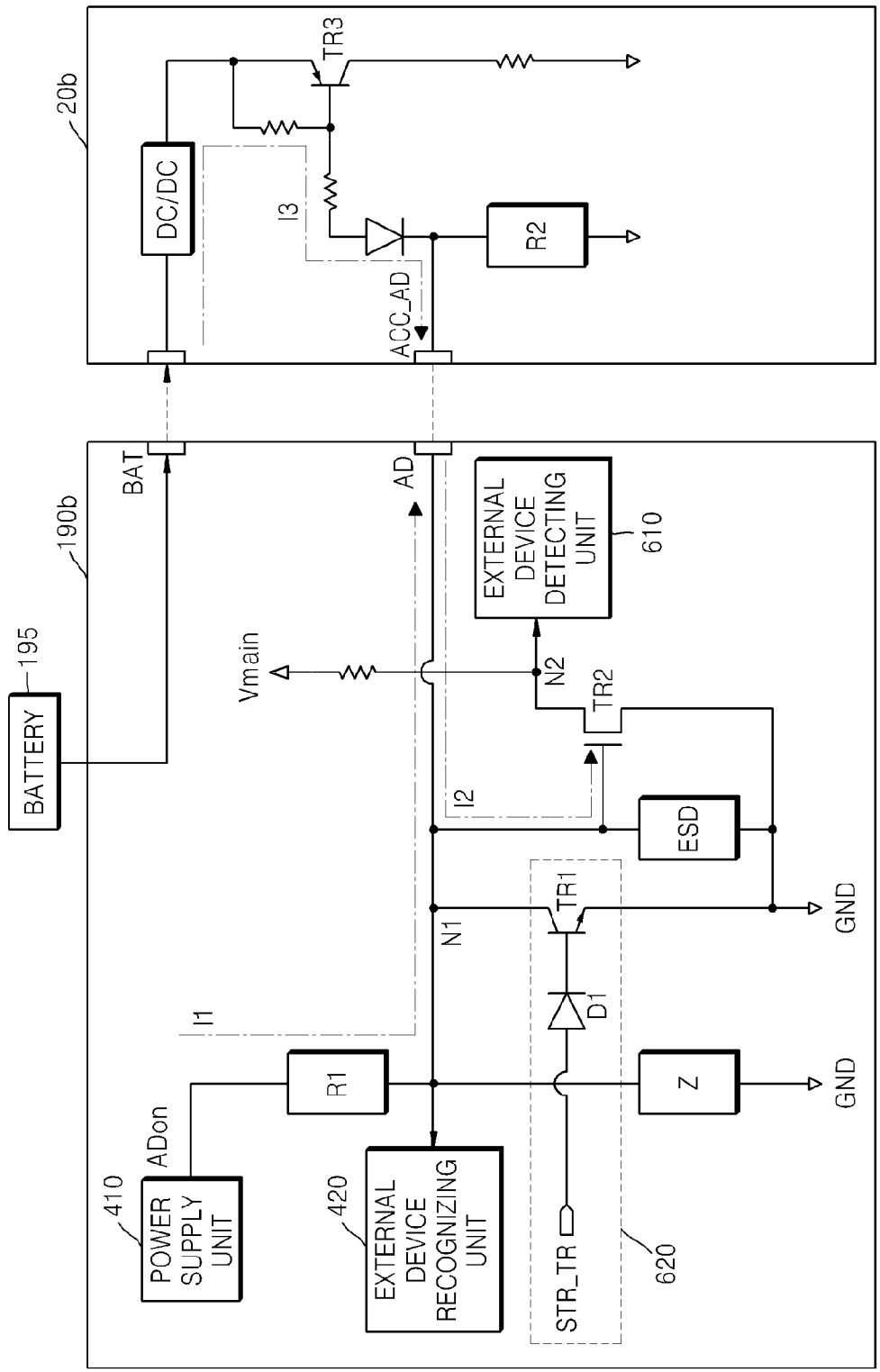
FIG. 7 illustrates structures of an external device connection portion and an external device according to another embodiment of the invention.

FIG. 7 illustrates structures of an external device connection portion 190b and an external device 20b according to another embodiment of the invention.

The external device connection portion 190b according to another embodiment of the invention may include the first resistor R1, the power supply unit 410, the external device recognizing unit 420, an external device detecting unit 610, a trigger signal generating unit 620, a Zener diode Z, and an electrostatic discharger (ESD).

The power supply unit 410 may use power output from the battery 195 to generate the first voltage ADon, and applies the first voltage ADon to one end of the first resistor R1. When the external device 20b is coupled to the connector 210, the power supply unit 410 according to the current embodiment of the invention applies the first voltage ADon to one end of the first resistor R1, and then when the external device 20b is completely recognized, stops supplying the first voltage ADon.

The first resistor R1 is connected between the power supply unit 410 and the first node N1. When the first terminal AD of the photographing apparatus 10 and the first counter terminal ACC_AD are electrically connected to each other, the first resistor R1 forms a voltage distribution circuit along with the second resistor R1 included in the external device 20b (11).

The external device recognizing unit 420 detects a voltage of the first node N1 to recognize a type of the external device 20b according to a voltage level of the first node N1.

The external device detecting unit 610 determines whether the external device 20b is connected to the photographing apparatus 10, by using power supplied from the external device 20b through the first counter terminal ACC_AD and the first terminal AD (12). If power is supplied from the external device 20b through the first terminal AD, a second transistor TR2 is turned on, and a current path is formed between a first power Vmain and a ground terminal GND, and thus a predetermined voltage is applied to a second node N2. Accordingly, the external device detecting unit 610 may measure a voltage level of the second node N2 to determine whether the external device 20b is connected to the photographing apparatus 10.

The external device detecting unit 610 may determine whether the external device 20b is connected to the photographing apparatus 10 periodically or continuously.

According to an embodiment of the invention, the external device 20b may operate using power supplied from the battery 195 of the photographing apparatus 10, and apply the power supplied from the battery 195 to the first terminal AD of the photographing apparatus 10 as power source for detection. In addition, the external device 20b may apply power to the first terminal AD of the photographing apparatus 10 after the supply of the first voltage ADon from the power supply unit 410 is stopped. To this end, when the type of the external device 20b is completely recognized, the photographing apparatus 10 may supply power to the external device 20b.

The trigger signal generating unit 620 transmits a trigger signal to the external device 20b according to a trigger control signal STR_TR supplied from the CPU/DSP 170 (see FIG. 1). The trigger signal is generated when the external device 20b is a speed light. The trigger signal generating unit 620 according to an embodiment includes a first transistor TR1 that is turned on according to a pulse of the trigger control signal STR_TR, when the first transistor TR1 is turned on, generates a current path that passes through the first counter terminal ACC_AD of the external device 20b, the first terminal AD of the photographing apparatus 10, the first node N1, and the first transistor TR1, and transmits the trigger signal to the external device 20b.

The Zener diode Z maintains a voltage of the first node N1 below a predetermined level when an unexpected high voltage is generated from the external device 20b and is applied through the first terminal AD. Accordingly, when the unexpected high voltage is applied from the external device 20b, the Zener diode Z prevents the photographing apparatus 10 from being destroyed due to the high voltage. In particular, a high performance speed light may include a pull-up resistor that applies a high voltage in a range of 12V to 24V, to the first terminal AD. In this case, the first terminal AD is likely to be destroyed due to excess voltage being applied thereto. In such a case, the Zener diode Z may prevent the first terminal AD from being destroyed.

The electrostatic discharger (ESD) is connected to the first node N1 and discharges static electricity when static electricity is generated around the first terminal AD.

According to the embodiments of the invention, a structure of a connector of a photographing apparatus to which an external device is coupled may be simplified.

In addition, according to the embodiments of the invention, even when an external device does not include a power supply, the external device may be recognized.

Furthermore, according to the embodiments of the invention, an external device is recognized by using an electrode included in a connector of the photographing apparatus, thereby extending compatibility of the external device. While this invention has been particularly shown and described with reference to exemplary embodiments thereof, it will be understood by those of ordinary skill in the art that various changes in form and details may be made therein without departing from the spirit and scope of the invention as defined by the appended claims. The exemplary embodiments should be considered in a descriptive sense only and not for purposes of limitation. Therefore, the scope of the invention is defined not by the detailed description of the invention but by the appended claims, and all differences within the scope will be construed as being included in the invention.

All references, including publications, patent applications, and patents, cited herein are hereby incorporated by reference to the same extent as if each reference were individually and specifically indicated as incorporated by reference and were set forth in its entirety herein.

The embodiments may be described in terms of functional block components and various processing steps. Such functional blocks may be realized by any number of components that perform the specified functions.

For the sake of brevity, conventional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. Moreover, no item or component is essential to the practice of the invention unless the element is specifically described as "essential" or "critical".

The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings. Expressions such as "at least one of," when preceding a list of elements, modify the entire list of elements and do not modify the individual elements of the list.

The use of the terms "a" and "an" and "the" and similar referents in the context of describing the invention (especially in the context of the following claims) should be construed to cover both the singular and the plural. Furthermore, recitation of ranges of values herein are merely intended to serve as a shorthand method of referring individually to each separate value falling within the range, unless otherwise indicated herein, and each separate value is incorporated into the specification as if it were individually recited herein. Finally, the steps of all methods described herein are performable in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed.

The words "mechanism" and "element" are used herein generally and are not limited solely to mechanical embodiments. Numerous modifications and adaptations will be readily apparent to those skilled in this art without departing from the spirit and scope of the invention.

What is claimed is:

1. A photographing apparatus comprising:
   a single conductor comprising a first terminal that is electrically connected to an external device;
   a first resistor that is electrically connected to the first terminal via a first node; and
   an external device recognizing unit that recognizes a type of the external device according to a voltage level of the first node; and
   a trigger signal generating unit that outputs a trigger signal triggering light emission of a speed light via the first terminal when the external device is the speed light,
   wherein:
     a voltage level of the first node is determined according to voltage distributions of the first resistor and a second resistor included in the external device, and
     both a presence of the external device is detected and the type of the external device is recognized using only the single conductor.

2. The photographing apparatus of claim 1, further comprising a power supply unit that applies a first voltage to an end other than the first node of the first resistor when the external device is connected to the conductor, and stops applying the first voltage when the type of the external device is completely recognized.

3. The photographing apparatus of claim 1, wherein the external device recognizing unit recognizes the type of the external device by using a lookup table including data about the voltage level of the first node according to the type of the external device.

4. The photographing apparatus of claim 1, wherein a first electrode transmits an analog signal.

5. The photographing apparatus of claim 1, further comprising an external device detecting unit that detects whether the external device is connected to the photographing apparatus by using power supplied from the external device.

6. The photographing apparatus of claim 5, further comprising:
   a power supply unit that applies the first voltage to the other end of the first resistor when the external device is connected to the conductor, and stops applying the first voltage when the type of the external device is completely recognized,
   wherein the external device detecting unit detects whether the external device is connected to the photographing apparatus after the applying of the first voltage is stopped.

7. The photographing apparatus of claim 5, further comprising:
   a transistor comprising:
     a gate terminal connected to the first terminal;
     a first terminal connected to a second node; and
     a grounded second terminal,
   wherein:
     the second node is coupled to a first power source,
     when the external device is connected to the photographing apparatus, power is supplied from the external device via the first terminal, and
     the external device detecting unit detects whether the external device is connected or not based on a voltage level of the second node as the transistor is electrically conductive due to the power supplied from the external device.

8. The photographing apparatus of claim 1, further comprising a Zener diode connected to the first terminal.

9. An external device connected to a photographing apparatus, the external device comprising:
   a second resistor having a resistance value determined according to a type of the external device, connected to the photographing apparatus via a single conductor comprising a first terminal of a single conductor of the photographing apparatus, and electrically connected to a first resistor included in the photographing apparatus, and
   a trigger signal generating unit that outputs a trigger signal triggering light emission of a speed light via the first terminal when the external device is the speed light,
   wherein a presence of the external device is detected and the type of the external device is recognized using only the single conductor.

10. The external device of claim 9, wherein when the external device is connected to the photographing apparatus, the external device operates using power supplied from the photographing apparatus.

11. The external device of claim 9, wherein the external device supplies a detection voltage, to the first terminal of the photographing apparatus by using the power supplied from the photographing apparatus.

12. A method of recognizing an external device by a photographing apparatus that recognizes a type of the external device when the external device is connected to the photographing apparatus, wherein the photographing apparatus comprises:
   a single conductor comprising a first terminal and a first resistor electrically connected to the first terminal via a first node, and
   the external device is connected to the photographing apparatus via the first terminal and comprises a second resistor that is electrically connected to the first resistor when the external device is connected to the photographing apparatus,
   wherein the method comprises:
     applying a first voltage to an end other than the first node of the first resistor;
     measuring a voltage level of the first node; and
     recognizing the type of the external device according to a voltage level of the first node; and
     outputting a trigger signal triggering light emission of a speed light via the first terminal if the external device is the speed light,
   wherein a presence of the external device is detected and the type of the external device is recognized using only the single conductor.

13. The method of claim 12, further comprising, when the type of the external device is completely recognized, stopping application of the first voltage.

14. The method of claim 12, wherein the type of the external device is recognized using a lookup table including data about the voltage level of the first node according to the type of the external device.

15. The method of claim 12, further comprising detecting whether the external device is connected to the photographing apparatus by using power supplied from the external device.

16. The method of claim 15, further comprising:
stopping application of the first voltage when the type of the external device is completely recognized,
wherein whether the external device is connected is detected after the applying of the first voltage is stopped.

17. The method of claim 12, wherein the second resistor of the external device has a resistance value determined according to the type of the external device.

18. The method of claim 12, wherein the external device operates using the power supplied from the photographing apparatus.

* * * * *